United States Patent
Bandic et al.

(10) Patent No.: US 7,209,314 B2
(45) Date of Patent: Apr. 24, 2007

(54) DISK DRIVE WITH PHASE-QUADRATURE SERVO PATTERN AND DEMODULATED POSITION ERROR SIGNAL INSENSITIVE TO TIMING AND PHASE-MISALIGNMENT ERRORS

(75) Inventors: Zvonimir Z. Bandic, San Jose, CA (US); Michael A. Moser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 211 days.

(21) Appl. No.: 11/148,752

(22) Filed: Jun. 9, 2005

(65) Prior Publication Data

US 2006/0279873 A1    Dec. 14, 2006

(51) Int. Cl.
 *G11B 5/596* (2006.01)
(52) U.S. Cl. .................................. 360/78.04; 360/77.08
(58) Field of Classification Search ............. 360/78.04, 360/77.08, 77.05, 75, 77.01, 77.11, 77.07, 360/48
See application file for complete search history.

(56) References Cited

U.S. PATENT DOCUMENTS

| | | | |
|---|---|---|---|
| 4,488,188 A * | 12/1984 | Hansen et al. .......... 360/77.11 |
| 4,511,938 A * | 4/1985 | Betts ..................... 360/77.08 |
| 4,549,232 A | 10/1985 | Axmear et al. |
| 4,669,003 A | 5/1987 | Bell et al. |
| 4,682,253 A * | 7/1987 | Leslie ..................... 360/77.07 |
| 5,182,682 A | 1/1993 | Weispfennig et al. |
| 5,301,072 A * | 4/1994 | Wilson .................... 360/77.01 |
| 5,521,771 A * | 5/1996 | Keithley et al. .............. 360/75 |
| 5,615,065 A | 3/1997 | Cheung |
| 5,717,538 A | 2/1998 | Cheung et al. |
| 5,966,264 A * | 10/1999 | Belser et al. ............ 360/77.08 |
| 6,034,835 A * | 3/2000 | Serrano ................... 360/77.05 |
| 6,118,603 A * | 9/2000 | Wilson et al. ................ 360/48 |
| 6,188,539 B1 * | 2/2001 | Elliot et al. ............. 360/77.08 |
| 6,426,844 B1 | 7/2002 | Anderson et al. |
| 6,426,845 B1 * | 7/2002 | Sacks et al. ............ 360/77.08 |
| 6,590,729 B1 | 7/2003 | Akagi et al. |

* cited by examiner

*Primary Examiner*—Fred F. Tzeng
(74) *Attorney, Agent, or Firm*—Thomas R. Berthold

(57) ABSTRACT

A magnetic recording disk drive uses a phase-quadrature position-error-signal (PES) pattern and a servo signal demodulator that is insensitive to clock errors and phase-misalignment errors. The disk has angularly-spaced servo sectors, with each servo sector having radially-spaced servo tracks that contain a phase-quadrature pattern of servo blocks. A first band in each servo sector contains two generally like patterns radially-spaced in the servo track with the second pattern phase-shifted 90 degrees along-the-track from the first pattern. A second band in each servo sector is spaced along-the-track from the first band and also has two patterns like those in the first band, but with the phase shift of the second pattern being in the opposite direction to the phase shift of the second pattern in the first band. The demodulator calculates the true amplitudes of the servo signal from the measured amplitudes of the servo signals from each band to thereby remove clock errors and phase-misalignment errors.

18 Claims, 6 Drawing Sheets

US 7,209,314 B2

DISK DRIVE WITH PHASE-QUADRATURE SERVO PATTERN AND DEMODULATED POSITION ERROR SIGNAL INSENSITIVE TO TIMING AND PHASE-MISALIGNMENT ERRORS

BACKGROUND OF THE INVENTION

1. Field of the Invention

This invention relates generally to magnetic recording hard disk drives, and more particularly to disk drives that use phase-quadrature servo patterns as part of the head-positioning servo control system.

2. Description of the Related Art

In a magnetic recording hard disk drive, the read/write head is moved across the data tracks of the rotating disk and maintained on the data tracks by an actuator, typically a rotary voice-coil-motor (VCM) actuator. The head detects a position-error-signal (PES) pattern from angularly-spaced servo sectors on the disk and generates a servo signal that is demodulated to provide the PES. The disk drive servo control system receives the PES and generates a control signal to the actuator to maintain the head on track and move it to the desired track for reading and writing of data. Each read/write head is attached to the end of a head carrier or air-bearing slider that rides on a cushion or bearing of air above the rotating disk. The slider is attached to a relatively flexible suspension that permits the slider to "pitch" and "roll" on the air bearing, with the suspension being attached to the end of the VCM actuator arm.

One type of PES pattern is a phase-quadrature pattern that has two generally like patterns radially-spaced in the servo track, but with one pattern phase shifted along-the-track from the other pattern. The pattern is called a quadrature pattern because it includes four bands spaced along-the-track, with the third and fourth bands radially spaced by one-half track from the first and second bands. The conventional servo-signal demodulator for a phase-quadrature pattern provides a PES that is a function of two amplitudes, with the two amplitudes directly corresponding to the servo signals from the two phase-shifted patterns. However, the conventional demodulator does not account for clock errors in reading the servo pattern and for phase-misalignment errors between the two phase-shifted patterns.

What is needed is a disk drive with a phase-quadrature PES pattern and a servo signal demodulator that is insensitive to clock errors and phase misalignment errors.

SUMMARY OF THE INVENTION

The invention is a disk drive with a phase-quadrature PES pattern and a servo signal demodulator that is insensitive to clock errors and phase-misalignment errors. Each servo sector has radially-spaced servo tracks that contain a phase-quadrature pattern of servo blocks. A first band in each servo sector contains two generally like patterns radially-spaced in the servo track with the second pattern phase-shifted 90 degrees along-the-track from the first pattern. A second band in each servo sector is spaced along-the-track from the first band and also has two patterns like those in the first band, but with the phase shift of the second pattern being in the opposite direction to the phase shift of the second pattern in the first band.

The servo signal from each band is the sum of a sine function and a cosine function. The demodulator calculates the sine and cosine amplitudes of the servo signals from each band and uses these four values to calculate the true amplitudes of the servo signal. The true amplitudes of the servo signal are the amplitudes after removal of clock errors and phase-misalignment errors. The PES is then calculated from the true amplitudes and used by the control system to generate the control signal to the actuator.

For a fuller understanding of the nature and advantages of the present invention, reference should be made to the following detailed description taken together with the accompanying figures.

DETAILED DESCRIPTION OF THE INVENTION

Figure 1:
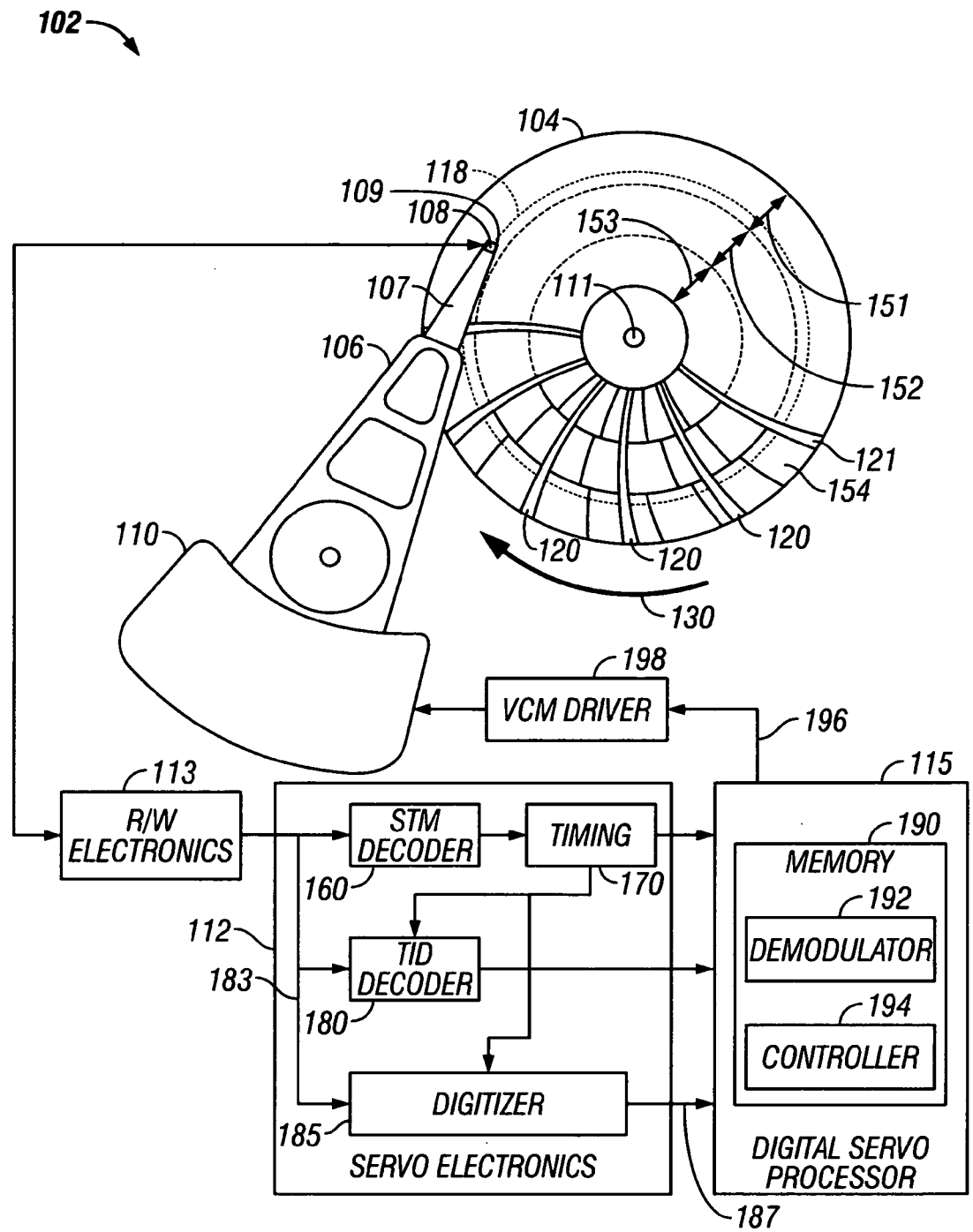
FIG. 1 is a block diagram of the disk drive of the present invention.

FIG. 1 is a block diagram of a disk drive according to the present invention. The disk drive uses servo positioning information located in angularly-spaced servo sectors for positioning the read/write heads. The disk drive, generally designated as 102, includes data recording disk 104, a voice coil motor (VCM) 110 as the actuator, an actuator arm 106, a suspension 107, a head carrier or air-bearing slider 108, a data recording transducer 109 (also called a head, recording head or read/write head), read/write electronics 113, servo electronics 112, and servo control processor 115.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 104. Typically, there are multiple disks stacked on a hub that is rotated by a disk motor, with a separate slider and recording head associated with each surface of each disk.

Data recording disk 104 has a center of rotation 111 and is rotated in direction 130. The disk 104 has a magnetic recording layer with radially-spaced concentric data tracks, one of which is shown as track 118. The disk drive in FIG. 1 is illustrated as a zone-bit-recording (ZBR) disk drive because the data tracks are grouped radially into a number of annular data zones or bands, three of which are shown as bands 151, 152 and 153, but the invention is fully applicable to a disk drive that does not use ZBR, in which case the disk drive would have only a single data band. Each data track has a reference index 121 indicating the start of track. Within each band, the tracks are also circumferentially divided into a number of data sectors 154 where user data is stored. If the disk drive has multiple heads, then the set of tracks which are at the same radius on all disk recording layers is referred to as a "cylinder".

Each data track also includes a plurality of circumferentially or angularly-spaced servo tracks. The servo tracks are also aligned radially so that they extend across the data tracks in a generally radial direction, as represented by radially-directed servo sectors 120. The servo positioning information in each servo sector typically includes a servo timing mark (STM), a track identification (TID) code, and a pattern of servo blocks that are decoded to provide a head position-error-signal (PES). The pattern of servo blocks, also called the PES pattern, may be high-frequency bursts of magnetic transitions as in conventional disk drives, or discrete magnetized islands or blocks separated by nonmagnetic regions as proposed for future disk drives.

The servo positioning information in the servo sectors is detected by the read head, sent to the read/write electronics 113, and input to the servo electronics 112 as a clocked data stream. The read head is controlled by a read clock. The servo electronics 112 provides digital signals to servo control processor 115. The servo control processor 115 provides a control signal 196 to VCM driver 198 that controls current to the VCM 110 to position the head 109.

Within the servo electronics 112, the STM decoder 160 detects the STM from the clocked data stream. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the TID, which is typically Gray-code encoded, and then passes the decoded TID information to servo control processor 115. Subsequently, the analog servo signal 183 from the clocked data stream is converted to a digital servo signal by digitizer 185 in servo electronics 112 and passed to the servo control processor 115 as a digital servo signal 187. The servo signal from the clocked data stream from R/W electronics 113 is the analog signal from the read head as the read head detects the PES pattern of servo blocks.

The servo control processor 115 is typically a programmable controller or microprocessor with associated memory 190. The processor 115 includes a stored demodulator program 192 that calculates a PES from the digitized servo signal, and a stored control program 194 that uses the PES to calculate the actuator control signal 196 sent to VCM driver 198. The control program 194 recalls from memory a set of parameters based on the static and dynamic characteristics of the "plant" being controlled, i.e., the VCM 110. The control program 194 is well-known and is essentially a matrix multiplication algorithm, and the controller parameters are coefficients used in the multiplication and stored in the memory 190 of processor 115.

Figure 2:
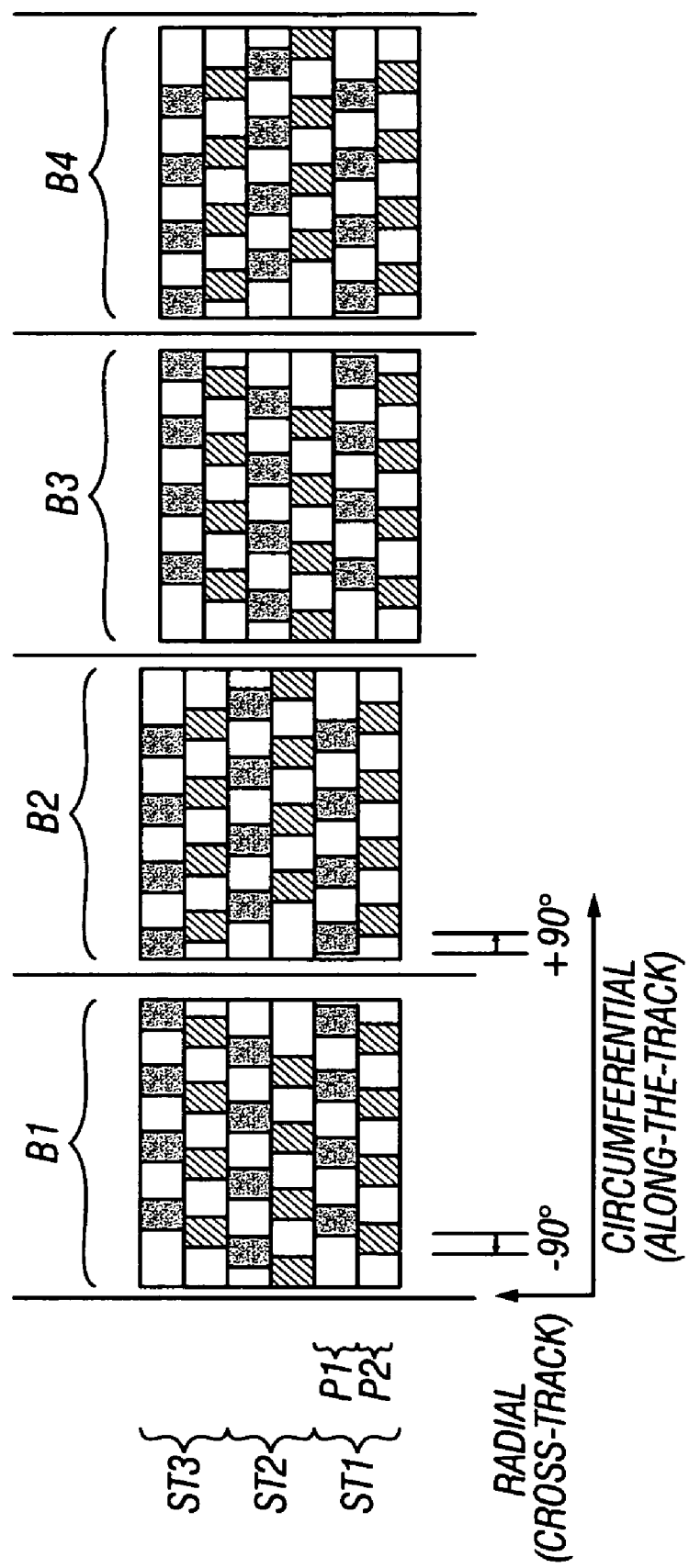
FIG. 2 shows the position-error-signal (PES) pattern of servo blocks in a portion of a typical servo sector according in the disk drive of the present invention.

FIG. 2 shows the PES pattern of servo blocks in a portion of a typical servo sector according to the present invention. The servo blocks in the sector are arranged in four circumferentially-spaced bands B1, B2, B3 and B4, with three typical servo tracks ST1, ST2 and ST3 being depicted. While only three servo tracks are depicted, the servo sector with bands B1–B4 extends radially across all the data tracks. For conventional magnetic recording disks, the shaded blocks and white blocks FIG. 2 represent high-frequency bursts of magnetic transitions magnetized in opposite directions, respectively. For example, for horizontal recording the shaded blocks represent magnetization in one direction along-the-track in the plane of the disk, and the white blocks represent magnetization in the opposite direction. For perpendicular recording the shaded blocks represent magnetization in one direction perpendicular to the plane of the disk, and the white blocks represent magnetization in the opposite direction. For disks with discrete magnetized islands or blocks separated by nonmagnetic regions, as proposed for future disk drives, the shaded blocks can represent magnetization in one direction, either in the plane or perpendicular to the plane of the disk, and the white blocks can represent the nonmagnetic regions, or vice-versa.

Servo track ST1 in band B1 includes a first pattern P1 of blocks along-the-track, and a second pattern P2 of blocks along-the-track but shifted along-the-track a distance of approximately one-half the circumferential width of a servo block. This is shown in B1 as a −90 degree phase shift. Servo track ST1 in band B2 includes a first pattern P1 of blocks along-the-track, and a second pattern P2 of blocks along-the-track. P1 and P2 in bands B1 and B2 are identical, but P2 in B2 is shifted from P1 in the direction opposite to the shift of P2 in B1. This is shown in B2 as a +90 degree phase shift. The PES pattern of servo blocks in bands B3 and B4 is identical to the previously-described pattern in B1 and B2, except that the pattern in B3 and B4 is shifted radially by one-half the radial width of a servo track. The PES pattern of servo blocks shown and described with respect to FIG. 2 is called a phase-quadrature PES pattern.

Figure 3A:
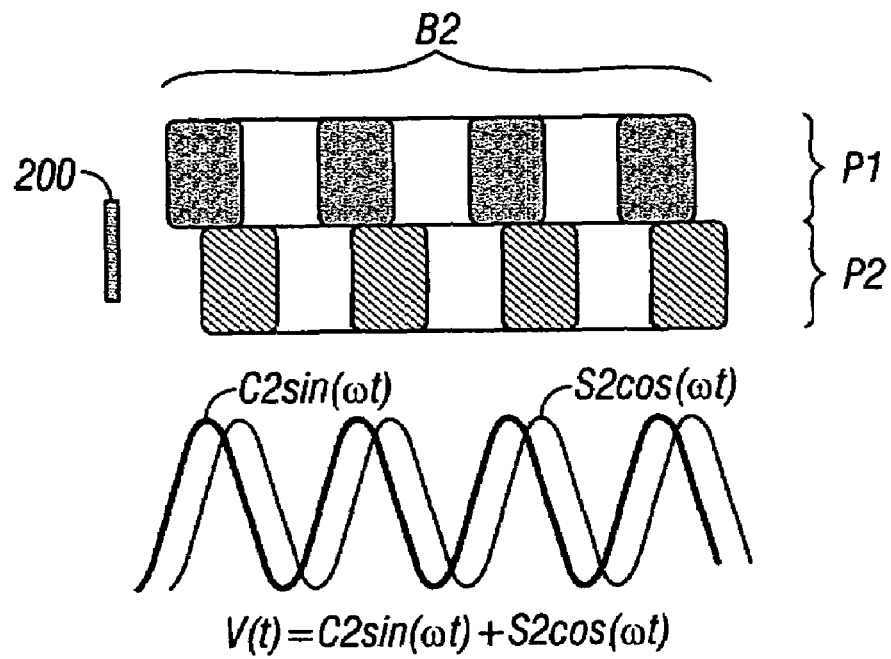
FIG. 3A depicts the phase quadrature of two patterns from a portion of a servo sector and the associated analog servo signal generated as the patterns pass the disk drive read head.
Figure 3B:
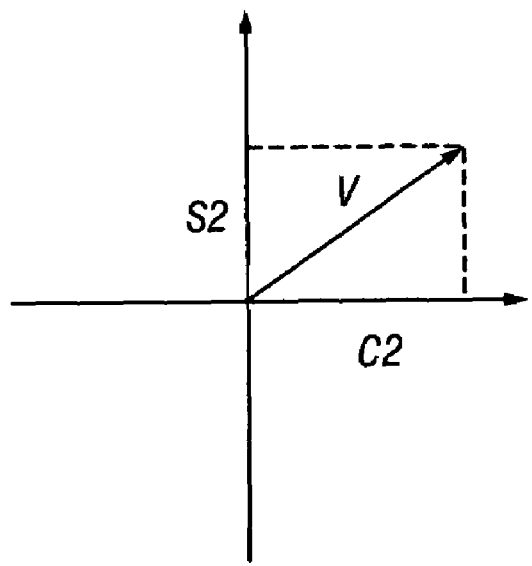
FIG. 3B is the associated phase diagram for the signal shown in FIG. 3A.

FIG. 3A depicts the phase quadrature of patterns P1, P2 from band B2 and the associated analog voltage signal V(t) as the patterns pass read head 200. The two signals from the two patterns P1, P2s are said to be in "phase quadrature" if the timing difference between them is equal to one quarter of the period (or if the phase difference is 90 degrees). The signal from the read head is the linear superposition of the contribution from the two patterns, and can be written as:

$$V(t) = C2\ \sin(\omega t) + S2\ \cos(\omega t) \qquad \text{Eq. (1)}$$

where C2 is the amplitude of the sine function from pattern P1 and S2 is the amplitude of the cosine function from pattern P2. FIG. 3B is the associated phase diagram showing vector V and its C2 and S2 components.

The C2 and S2 amplitudes are the measured amplitudes from the measured or detected signal V(t) and are used to calculate the PES, with the term (C2-S2) representing radial position of the head 100 in the servo track. The C2 and S2 amplitudes can be determined by multiplying both sides of Eq. (1) by $\sin(\omega t)$ or $\cos(\omega t)$, respectively, and integrating over the period from 0 to T, resulting in the following equations:

$$C2 = (2/T)\ \text{INTEGRAL}\ [V(t)\ \sin(\omega t) dt] \qquad \text{Eq. (2A)}$$

$$S2 = (2/T)\ \text{INTEGRAL}\ [V(t)\ \cos(\omega t) dt] \qquad \text{Eq. (2B)}$$

The prior art servo signal demodulator assumes that the C2 and S2 measured amplitudes are the true amplitudes A and B, respectively, from the sine and cosine signals generated by the two patterns P1, P2, respectively, and thus generates or calculates A and B directly from equations 2A–2B. The calculated A and B terms are then used to calculate the PES, typically as A−B or atan (A/B).

Figure 4A:
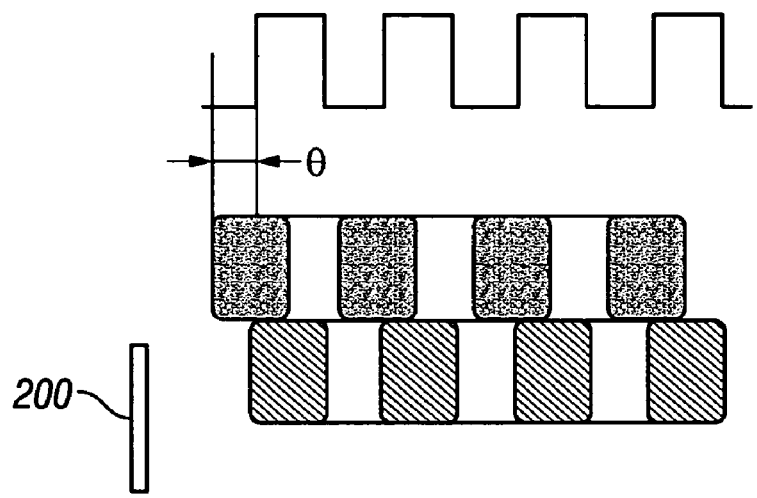
FIG. 4A depicts the phase quadrature of the two patterns shown in FIG. 3A, but with a clock error.
Figure 4B:
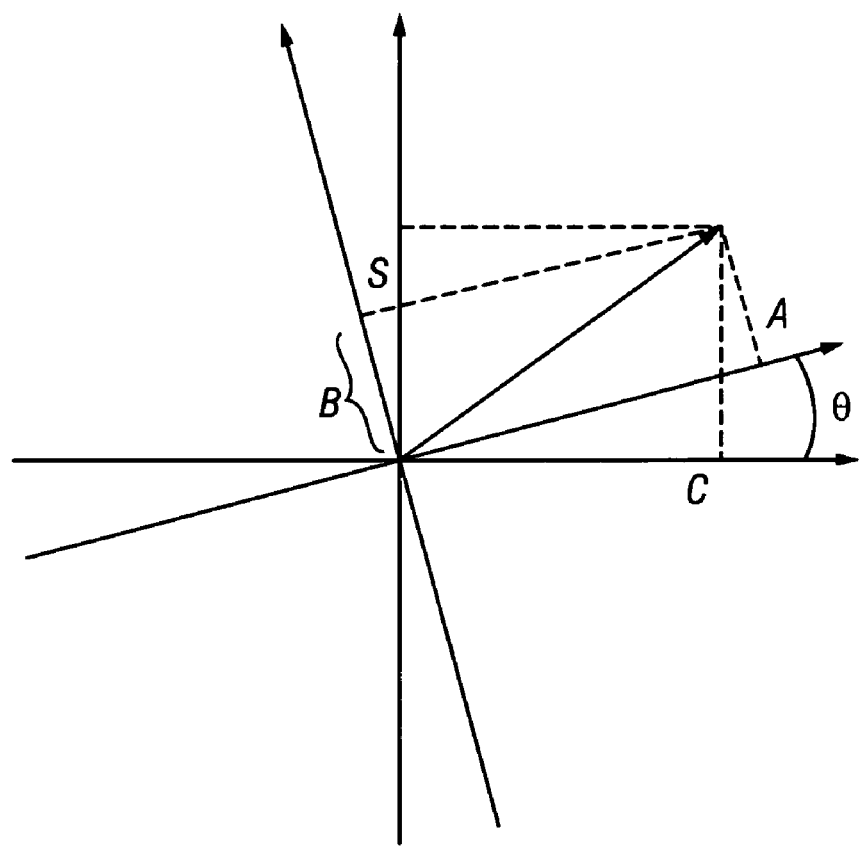
FIG. 4B is the associated phase diagram for the servo signal with a clock error.

However, C2 and S2 would be the true amplitudes A and B, respectively, only if there were no clock errors when reading P1 and P2 and no timing errors when P1 and P2 were servowritten. However, if there is a clock error $\theta$ when the head reads the patterns, as shown in FIG. 4A, then the true amplitudes A and B may be calculated by rotating the C and S coordinate system by the angle $\theta$ in the phase diagram shown in FIG. 4B. This results in the following equations for C2 and S2:

$$C2 = A \cos \theta - B \sin \theta \qquad \text{Eq. (3A)}$$

$$S2 = B \cos \theta + A \sin \theta \qquad \text{Eq. (3B)}$$

Figure 5A:
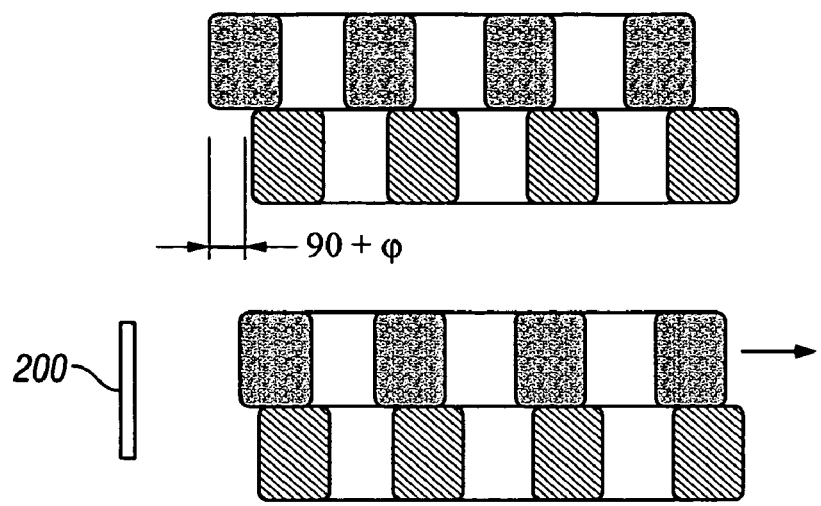
FIG. 5A depicts the phase quadrature of the two patterns shown in FIG. 3A, but with a phase misalignment between the two patterns.
Figure 5B:
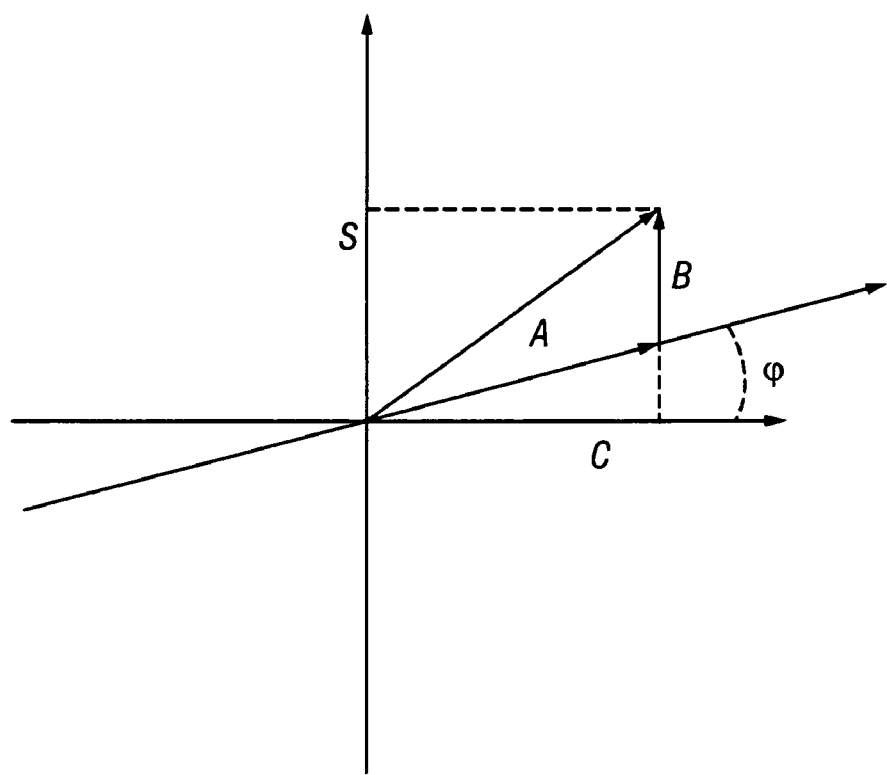
FIG. 5B is the associated phase diagram for the servo signal with a phase misalignment between the two patterns.

In addition to a clock error, there may be a misalignment of the two patterns P1, P2 along-the-track so that the phase shift between the two patterns is not precisely 90 degrees (i.e., not precisely one-half the circumferential width of a block). This may be the result of an error when the servo tracks are written. The result would be a phase misalignment $\phi$, as shown in FIG. 5A. In the presence of the phase misalignment $\phi$ then the true amplitudes A and B are related to C2 and S2 as shown in the phase diagram of FIG. 5B. This results in the following equations for C2 and S2:

$$C2 = A \cos \phi \qquad \text{Eq. (4A)}$$

$$S2 = B + A \sin \phi \qquad \text{Eq. (4B)}$$

Figure 6A:
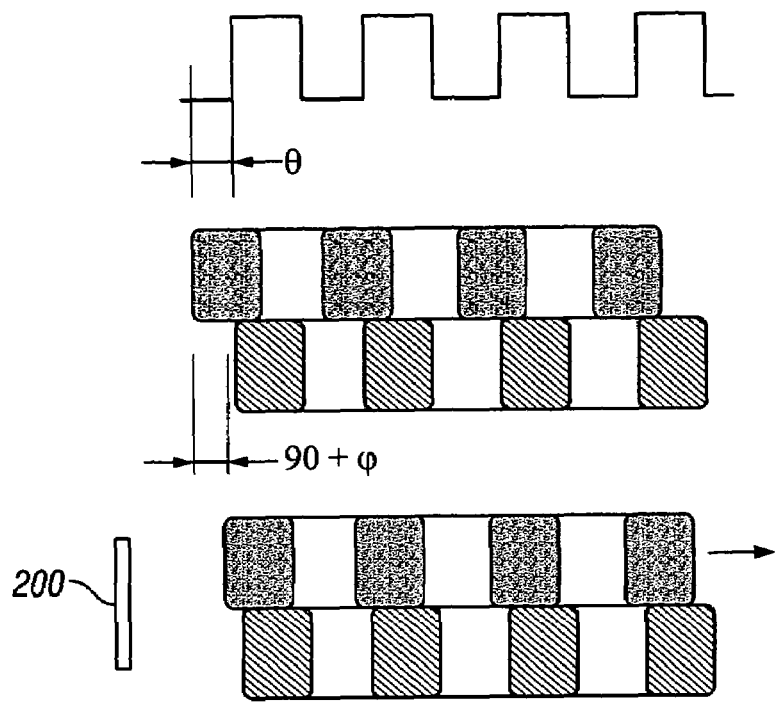
FIG. 6A depicts the phase quadrature of the two patterns shown in FIG. 3A, but with a clock error and a phase misalignment between the two patterns.
Figure 6B:
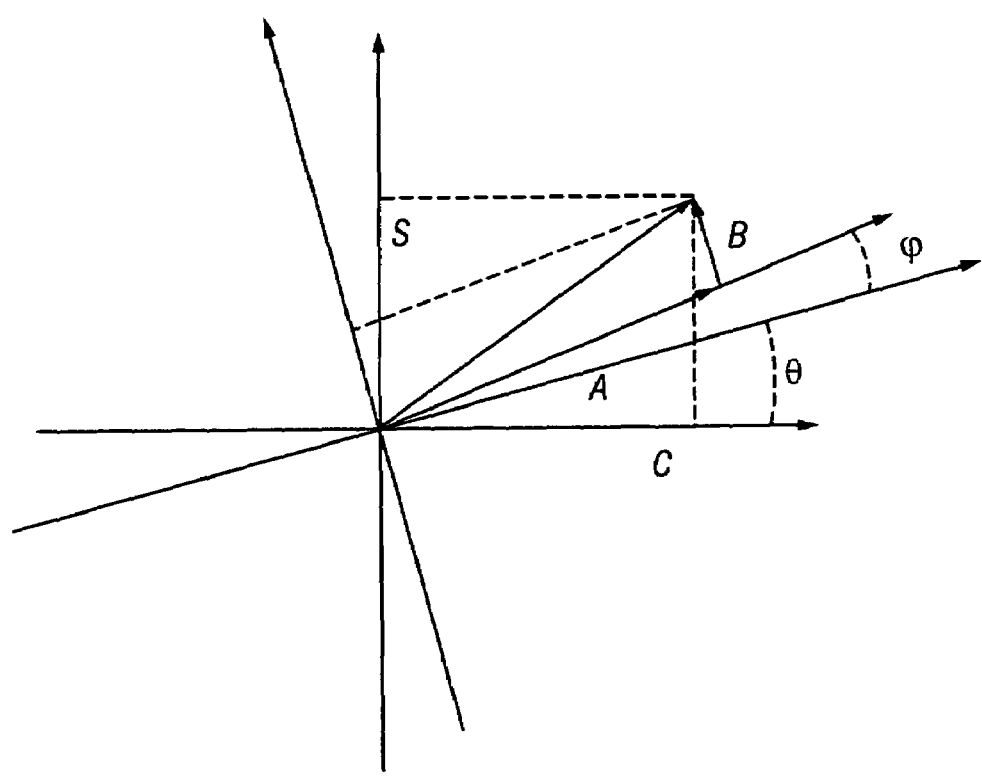
FIG. 6B is the associated phase diagram for the servo signal with a clock error and a phase misalignment between the two patterns.

When both a clock error $\theta$ and a phase misalignment $\phi$ are present, as depicted in FIG. 6A, then the true amplitudes A and B are related to C2 and S2 as shown in the phase diagram of FIG. 6B. This results in the following equations for C2 and S2:

$$C2 = A \cos(\theta+\phi) - B \sin \theta \qquad \text{Eq. (5A)}$$

$$S2 = A \sin(\theta+\phi) + B \cos \theta \qquad \text{Eq. (5B)}$$

The above description of the effect of clock and phase misalignment errors on the PES has been explained with respect to band B2 (FIG. 2). The same effect will occur in band B1, resulting in the following equations correlating the C and S amplitudes with the true amplitudes A and B in band B1:

$$C1 = A \cos(\theta+\phi) + B \sin \theta \qquad \text{Eq. (6A)}$$

$$S1 = A \sin(\theta+\phi) - B \cos \theta \qquad \text{Eq. (6B)}$$

From equations 5A–5B and 6A–6B, the true amplitudes A and B can be derived from the measured C and S amplitudes when both bands B1 and B2 pass the read head. The following equations result:

$$A = SQRT\{0.25[(S1+S2)^2+(C1+C2)^2]\} \qquad \text{Eq. (7A)}$$

$$B = SQRT\{0.25[(S1-S2)^2+(C1-C2)^2]\} \qquad \text{Eq. (7B)}$$

Equations 7A–7B enable the PES to be calculated from the true amplitudes A and B, with clock errors and phase misalignment errors removed. The calculated PES represents the radial position of the read head in a servo track, and is typically calculated from A and B by one of the following equations:

$$PES = A - B \qquad \text{Eq. (8A)}$$

$$PES = \operatorname{atan}(A/B) \qquad \text{Eq. (8B)}$$

The servo control processor (FIG. 1) uses the PES as the input to the control program to generate the actuator control signal 196 to reposition the read head in the servo track.

For ease in explanation, the present invention has been explained using supposedly distinct "sine" and "cosine" functions. However, as is well known, a cosine function and a sine function are identical, except for a 90 degree shift in the origin. Thus the invention could have been explained using two sine functions with a 90 degree shift between them, or two cosine functions with a 90 degree shift between them, but such an explanation would have been unnecessarily complicated. Thus reference to these terms in the claims is not to be considered limiting.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
 a rotatable magnetic recording disk having a plurality of concentric circular data tracks and generally circumferentially-spaced servo sectors extending generally radially across the data tracks, each servo sector comprising a plurality of radially-spaced servo tracks, wherein each servo track comprises a phase quadrature pattern of servo blocks, said pattern having a first band and a second band spaced circumferentially from the first band;
 a read head that generates a clocked data stream that includes an analog servo signal from detection of the phase quadrature pattern of servo blocks, said analog servo signal being generally the sum of a sine function and a cosine function;
 an actuator connected to the head for positioning the head to different data tracks and maintaining the head on the tracks;
 servo electronics for digitizing the analog servo signal from the head; and
 a servo control processor comprising a demodulator for calculating a head position error signal (PES) from the digital servo signal and a controller for generating an actuator control signal from the PES, the demodulator comprising a program of instructions readable by the processor for undertaking method acts comprising:
  calculating the sine and cosine measured amplitudes of the digitized servo signal from the first and second bands, said measured amplitudes representing the radial position of the head in the presence of any circumferential misalignment in the pattern of servo blocks and in the presence of any clock error during detection of the servo blocks by the read head; and
  calculating from said measured amplitudes the sine and cosine true amplitudes of the digitized servo signal, said true amplitudes representing the radial position the head without any of said misalignment and any of said clock error.

2. The disk drive of claim 1 wherein calculating the sine and cosine measured amplitudes of the digitized servo signal from the first and second bands comprises:
 (a) calculating the sine and cosine amplitudes C1, S1, respectively, of the digitized servo signal from the first band; and
 (b) calculating the sine and cosine amplitudes C2, S2 of the digitized servo signal from the second band.

3. The disk drive of claim 2 wherein calculating the sine and cosine true amplitudes of the digitized servo signal comprises:
(c) calculating a term A according to the equation $$A=SQRT\{0.25[(S1+S2)^2+(C1+C2)^2]\};$$

(d) calculating a term B according to the equation $$B=SQRT\{0.25[(S1-S2)^2+(C1-C2)^2]\};\text{ and}$$

further comprising
(e) calculating PES from A and B.

4. The disk drive of claim 3 wherein each band has first and second like patterns of like servo blocks with the second pattern spaced radially from the first pattern and shifted circumferentially from the first pattern by approximately one-half the circumferential width of a servo block, the second pattern in the second band being shifted opposite to the direction of shift of the second pattern in the first band, and wherein C1 and S1 represent the amplitudes of the servo signal from the first and second patterns, respectively, and C2 and S2 represent the amplitudes of the servo signal from the first and second patterns, respectively.

5. The disk drive of claim 3 wherein calculating PES from A and B comprises calculating A−B.

6. The disk drive of claim 3 wherein calculating PES from A and B comprises calculating atan (A/B).

7. The disk drive of claim 1 wherein each servo track further comprises third and fourth bands spaced circumferentially from the first and second bands, the third and fourth bands being like said first and second bands, respectively, but spaced radially therefrom by one-half the radial track width of the servo track.

8. The disk drive of claim 1 wherein the servo blocks comprise bursts of magnetic transitions.

9. The disk drive of claim 1 wherein the servo blocks comprise discrete magnetized islands separated by nonmagnetic regions.

10. A magnetic recording disk drive comprising:
a rotatable magnetic recording disk having a plurality of concentric circular data tracks and generally circumferentially-spaced servo sectors extending generally radially across the data tracks, each servo sector comprising a plurality of radially-spaced servo tracks, wherein each servo track comprises a first band and a second band spaced circumferentially from the first band, each band having first and second like patterns of like servo blocks with the second pattern spaced radially from the first pattern and shifted circumferentially from the first pattern by approximately one-half the circumferential width of a servo block, the second pattern in the second band being shifted opposite to the direction of shift of the second pattern in the first band;
a read head that reads data from the data tracks and detects servo blocks from the servo tracks as the disk rotates, the servo signal from the head from the detection of the pattern of servo blocks being generally the sum of a sine function and a cosine function;
an actuator connected to the head for positioning the head to different data tracks and maintaining the head on the tracks;
servo electronics for digitizing the servo signal from the head; and
a servo control processor comprising a demodulator for calculating a head position error signal (PES) from the digital servo signal and a controller for generating an actuator control signal from the PES, the demodulator comprising a program of instructions readable by the processor for undertaking method acts comprising:
(a) calculating the sine and cosine amplitudes C1, S1, respectively, of the digitized servo signal from the first band;
(b) calculating the sine and cosine amplitudes C2, S2 of the digitized servo signal from the second band;
(c) calculating a term A according to the equation $$A=SQRT\{0.25[(S1+S2)^2+(C1+C2)^2]\};$$

(d) calculating a term B according to the equation $$B=SQRT\{0.25[(S1-S2)^2+(C1-C2)^2]\};\text{ and}$$

(e) calculating PES from A and B.

11. The disk drive of claim 10 wherein calculating PES from A and B comprises calculating A−B.

12. The disk drive of claim 10 wherein calculating PES from A and B comprises calculating atan (A/B).

13. The disk drive of claim 10 wherein each servo track further comprises third and fourth bands spaced circumferentially from the first and second bands, the third and fourth bands being like said first and second bands, respectively, but spaced radially therefrom by one-half the radial track width of the servo track.

14. The disk drive of claim 10 wherein the servo blocks comprise bursts of magnetic transitions.

15. The disk drive of claim 10 wherein the servo blocks comprise discrete magnetized islands separated by nonmagnetic regions.

16. A method of operating a disk drive, the disk drive including (a) a rotatable magnetic recording disk having a plurality of concentric data tracks and generally circumferentially-spaced servo sectors extending generally radially across the data tracks, each servo sector comprising a plurality of radially-spaced servo tracks, wherein each servo track comprises a phase quadrature pattern of servo blocks, said pattern having a first band and a second band spaced circumferentially from the first band; (b) a read head that reads data from the data tracks and detects servo blocks from the servo tracks as the disk rotates, the servo signal from the head from the detection of the phase quadrature pattern of servo blocks being generally the sum of a sine function and a cosine function; (c) an actuator connected to the head and responsive to a control signal for positioning the head to different data tracks and maintaining the head on the tracks; and (d) a processor for generating the actuator control signal from the servo signal; the method of operating the disk drive comprising the processor-implemented method of:
calculating the sine and cosine amplitudes C1, S1, respectively, of the servo signal from a first band;
calculating the sine and cosine amplitudes C2, S2, respectively, of the servo signal from a second band;
calculating a term A according to the equation $$A=SQRT\{0.25[(S1+S2)^2+(C1+C2)^2]\};$$

calculating a term B according to the equation $$B=SQRT\{0.25[(S1-S2)^2+(C1-C2)^2]\};$$

calculating a head position-error-signal (PES) from A and B; and
calculating the actuator control signal from the PES.

17. The method of claim 16 wherein calculating PES from A and B comprises calculating A−B.

18. The method of claim 16 wherein calculating PES from A and B comprises calculating atan (A/B).

* * * * *